US011516086B1

(12) United States Patent
Cherian et al.

(10) Patent No.: US 11,516,086 B1
(45) Date of Patent: Nov. 29, 2022

(54) METHOD AND APPARATUS FOR AUTOMATED SPANNING-TREE LOOP DETECTION IN NETWORKS

(71) Applicant: Cisco Technology, Inc., San Jose, CA (US)

(72) Inventors: Zachariah Cherian, Cupertino, CA (US); Samer Salam, Beirut (LB); Ajay Madhavan, Milpitas, CA (US); Tarunesh Ahuja, Fremont, CA (US); Michael Michaelides, San Jose, CA (US); Smruti Dilip Lele, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 718 days.

(21) Appl. No.: 16/560,902

(22) Filed: Sep. 4, 2019

(51) Int. Cl.
*H04L 41/12* (2022.01)
*H04L 41/16* (2022.01)
*H04L 43/10* (2022.01)
*H04L 12/44* (2006.01)

(52) U.S. Cl.
CPC .............. *H04L 41/12* (2013.01); *H04L 12/44* (2013.01); *H04L 41/16* (2013.01); *H04L 43/10* (2013.01)

(58) Field of Classification Search
CPC ......... H04L 41/12; H04L 12/44; H04L 41/16; H04L 43/10
See application file for complete search history.

(56) References Cited

U.S. PATENT DOCUMENTS

| | | | |
|---|---|---|---|
| 7,463,597 B1 * | 12/2008 | Kompella | H04L 12/462 370/256 |
| 7,609,658 B2 | 10/2009 | Niazi et al. | |
| 8,355,348 B1 * | 1/2013 | Miller | H04L 12/42 370/256 |
| 8,441,941 B2 | 5/2013 | McDade et al. | |
| 9,929,878 B1 | 3/2018 | Sudharshan et al. | |
| 10,079,752 B2 | 9/2018 | Manthiramoorthy et al. | |
| 2008/0304428 A1 | 12/2008 | Stilling et al. | |
| 2018/0351819 A1 * | 12/2018 | Mohanram | H04L 41/16 |

FOREIGN PATENT DOCUMENTS

WO   WO-2018024809 A1 *   2/2018   ............. G06F 9/547

* cited by examiner

*Primary Examiner* — Duc C Ho
(74) *Attorney, Agent, or Firm* — Polsinelli

(57) ABSTRACT

Systems, methods, and computer-readable media for identifying a spanning tree loop in a network environment. Spanning tree loop indicators occurring in a network environment that utilizes a spanning tree protocol are identified. The spanning tree loop indicators are correlated to identify correlated spanning tree loop indicators within the network environment. A potential spanning tree loop is recognized from a plurality of the correlated spanning tree loop indicators based on indicator types of the correlated spanning tree loop indicators. The potential spanning tree loop is remedied in the network environment in response to recognizing the potential spanning tree loop in the network environment.

20 Claims, 8 Drawing Sheets

METHOD AND APPARATUS FOR AUTOMATED SPANNING-TREE LOOP DETECTION IN NETWORKS

TECHNICAL FIELD

The present technology pertains to identifying a spanning tree loop in a network environment, and in particular to identifying a location of the spanning tree loop in the network environment and remedying the spanning tree loop in the network environment.

BACKGROUND

Spanning tree protocol (STP) loops are a serious network condition that can quickly lead to network outages and disrupt business operations. Specifically STP loops can lead to broadcast storms in the network. In turn, broadcast storms can saturate link bandwidth, and on some network devices cause high CPU utilization, thereby starving various control protocols. This can even cause Layer 3 interior gateway protocol (IGP) failure. There therefore exist needs for systems and methods for detecting STP loops quickly in a network environment before the STP loop can critically affect operations in the network environment.

STP loops can arise in a network environment for a number of reasons. Specifically, unidirectional link failures, switch misconfigurations, incorrect wiring between nodes in the network environment, connecting an incorrectly implemented switch in a network environment that blocks bridge protocol data units (BPDUs), and server misconfigurations with virtual traffic switches can all lead to STP loops. While STP loops can be formed for a variety of different reasons, quickly identifying the occurrence of an STP loop and subsequently remedying the STP loop remains difficult. Specifically, STP loops are often identified after the loops have already caused network outages. Further, remedying the STP loop can often take hours after it is initially identified leading to continued network outages and poor network service. In turn, there exist needs for systems and methods of identifying a location of an STP loop in a network environment and remedying the STP loop based on the location of the STP loop within the network environment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
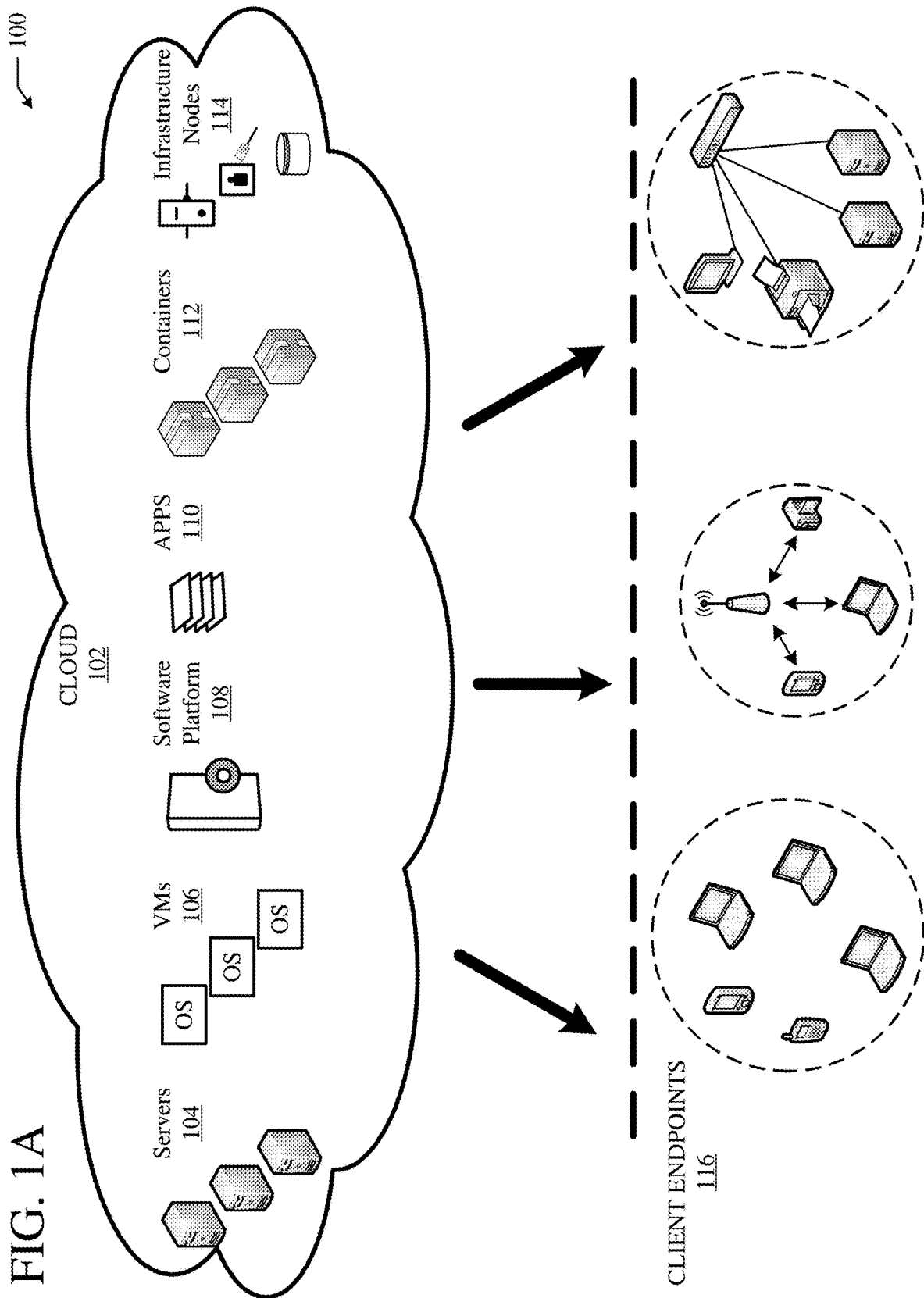
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include identifying spanning tree loop indicators occurring in a network environment that utilizes a spanning tree protocol. The spanning tree loop indicators can be correlated to identify correlated spanning tree loop indicators within the network environment. A potential spanning tree loop in the network environment can be recognized from a plurality of the correlated spanning tree loop indicators based on indicator types of the correlated spanning tree loop indicators. The potential spanning tree loop can be remedied in response to recognizing the spanning tree loop in the network environment.

A system can include one or more processors and at least one computer-readable storage medium storing instructions which, when executed by the one or more processors, cause the one or more processors to identify spanning tree loop indicators occurring in a network environment that utilizes a spanning tree protocol. The instructions can also cause the one or more processors to correlate the spanning tree loop indicators to identify correlated spanning tree loop indicators within the network environment. Further, the instructions can cause the one or more processors to recognize a potential spanning tree loop in the network environment from a plurality of the correlated spanning tree loop indicators based on indicator types of the correlated spanning tree loop indicators.

A non-transitory computer-readable storage medium having stored therein instructions which, when executed by a processor, cause the processor to identify spanning tree loop indicators occurring in a network environment that utilizes a spanning tree protocol. The instructions can also cause the processor to recognize a potential spanning tree loop in the network environment based on the spanning tree loop indicators including two or more different types of spanning tree loop indicators. Further, the instructions can cause the processor to remedy the potential spanning tree loop in the network environment in response to recognizing the potential spanning tree loop in the network environment.

EXAMPLE EMBODIMENTS

The disclosed technology addresses the need in the art for identifying spanning tree loops in a network environment. Further, the disclosed technology addresses the needs in the art for identifying a location of a spanning tree loop and remedying the spanning tree loop in a network environment. The present technology involves system, methods, and computer-readable media for identifying a potential spanning tree loop in a network environment based on correlated spanning tree loop indicators. Additionally, the present technology involves systems, methods, and computer-readable media for identifying a location of a potential spanning tree loop in a network environment using a network topology and remedying the spanning tree loop in the network environment, e.g. based on its location.

Figure 5:
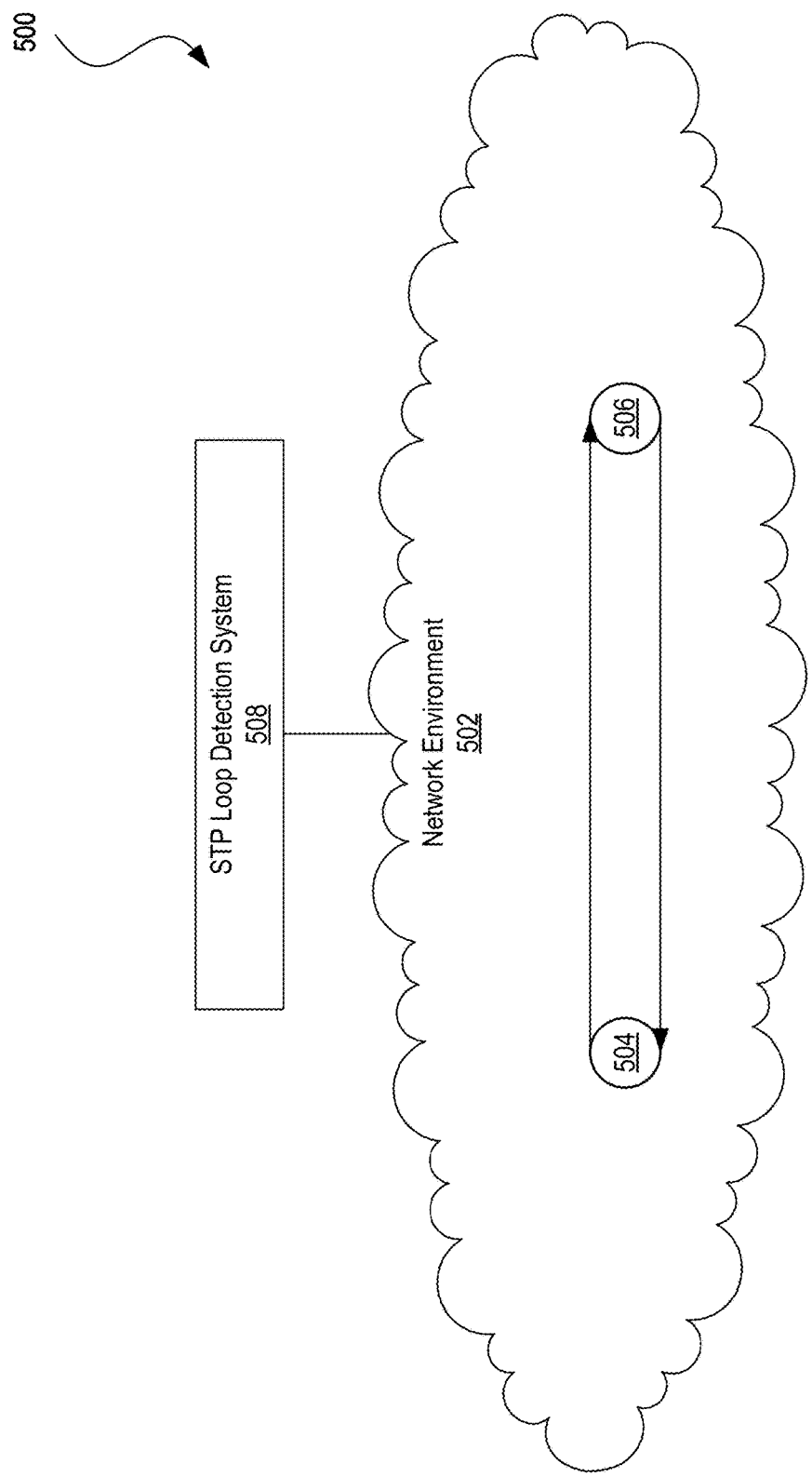
FIG. 5 illustrates an example environment for detecting and remedying a spanning tree loop in a network environment.
Figure 6:
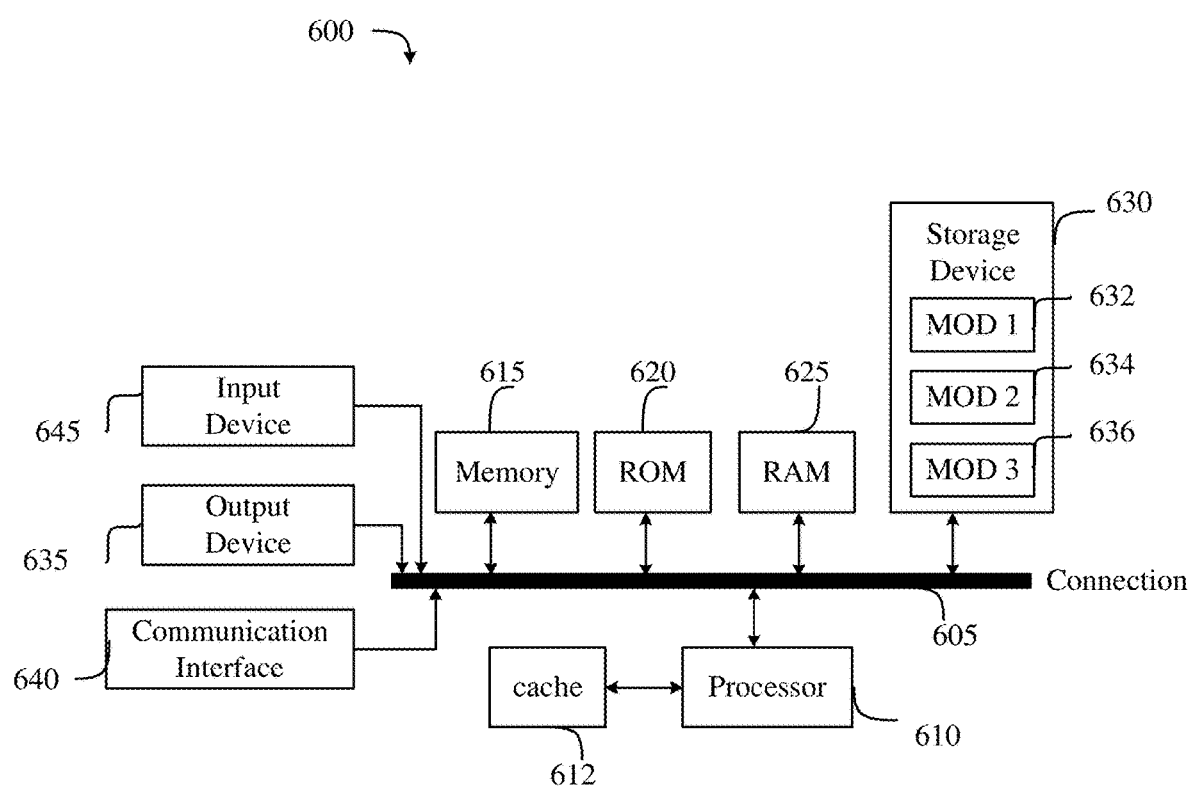
FIG. 6 illustrates an example computing system.
Figure 7:
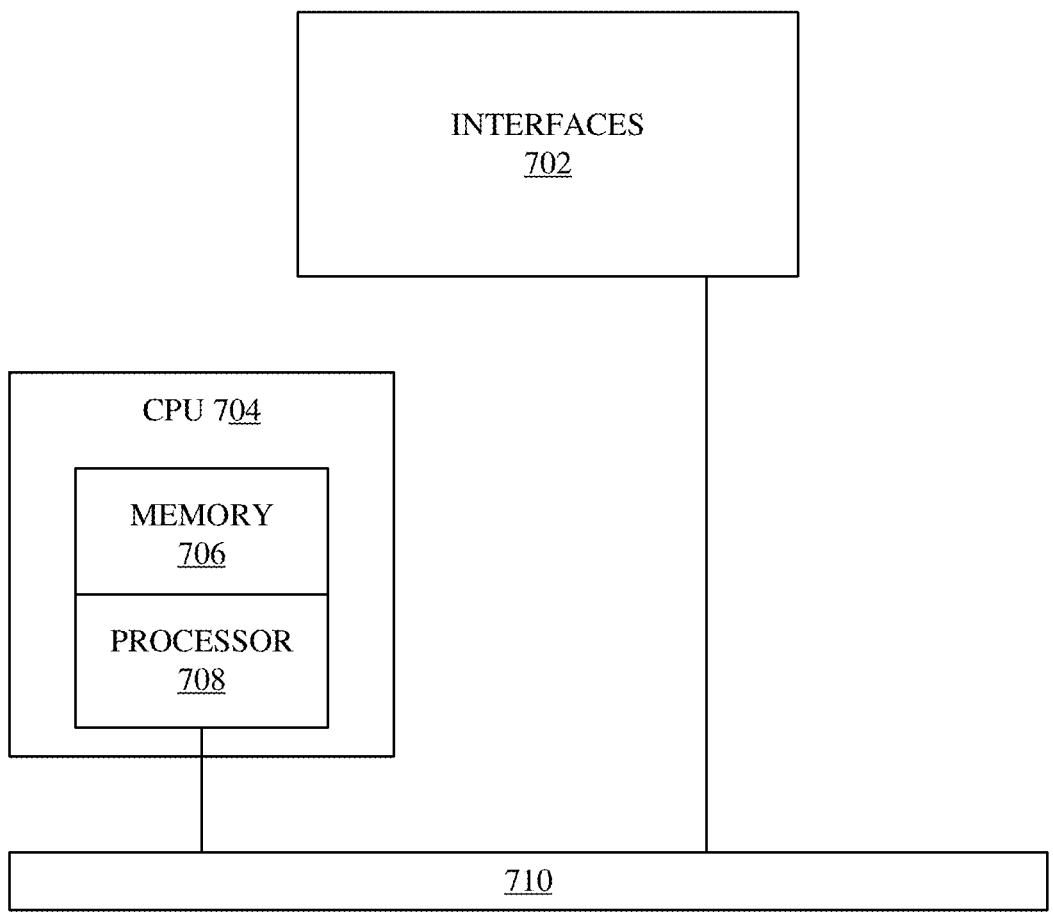
FIG. 7 illustrates an example network device.

A description of network environments and architectures for network data access and services, as illustrated in FIGS. 1-4 is first disclosed herein. A discussion of systems, methods, and computer-readable media for identifying and remedying potential spanning tree loops, as shown in FIG. 5, will then follow. The discussion then concludes with a brief description of example devices, as illustrated in FIGS. 6 and 7. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
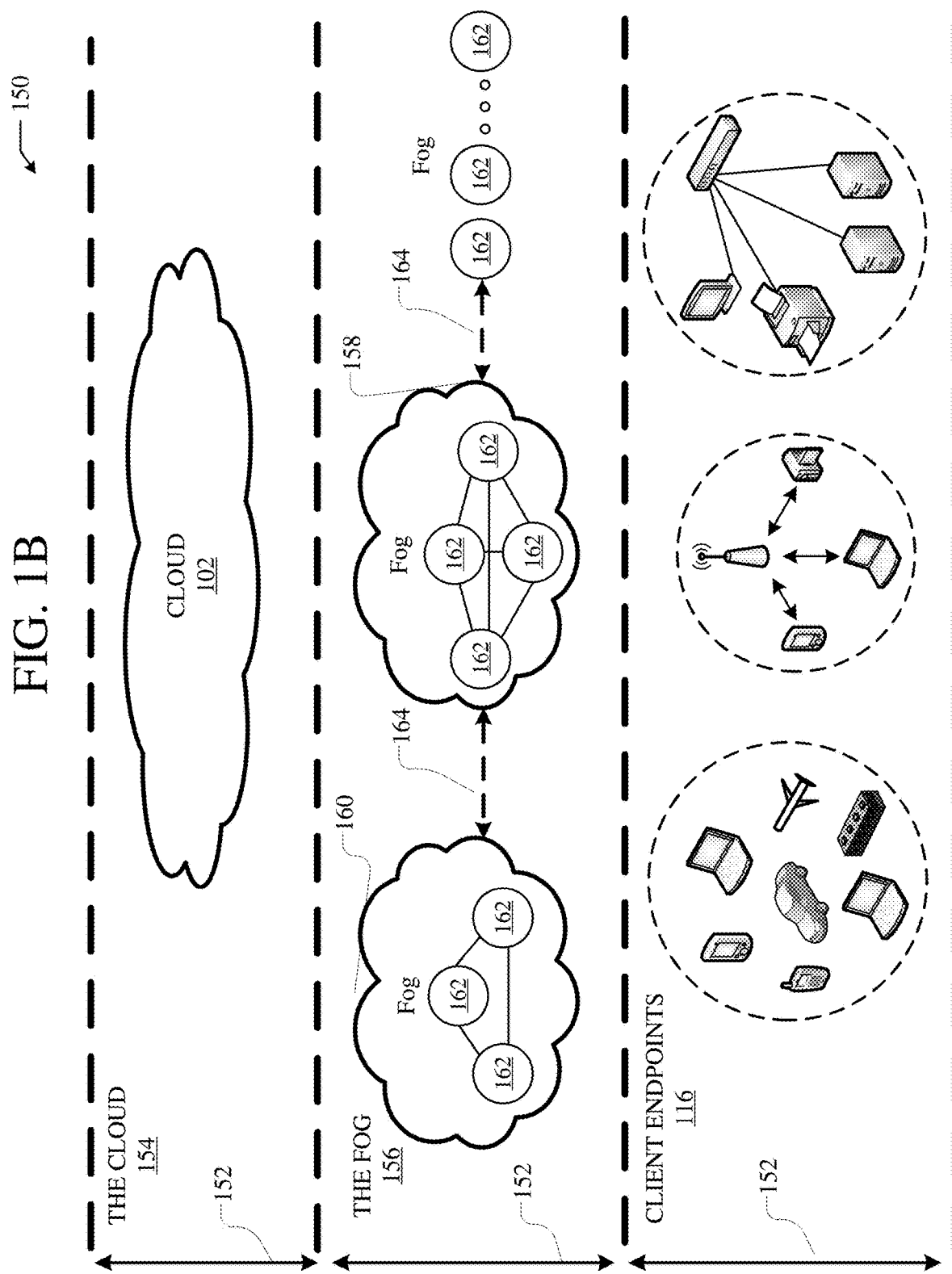
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographical locations, logical locations or networks, and/or fog instances while maintaining connectivity with the cloud layer 154 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
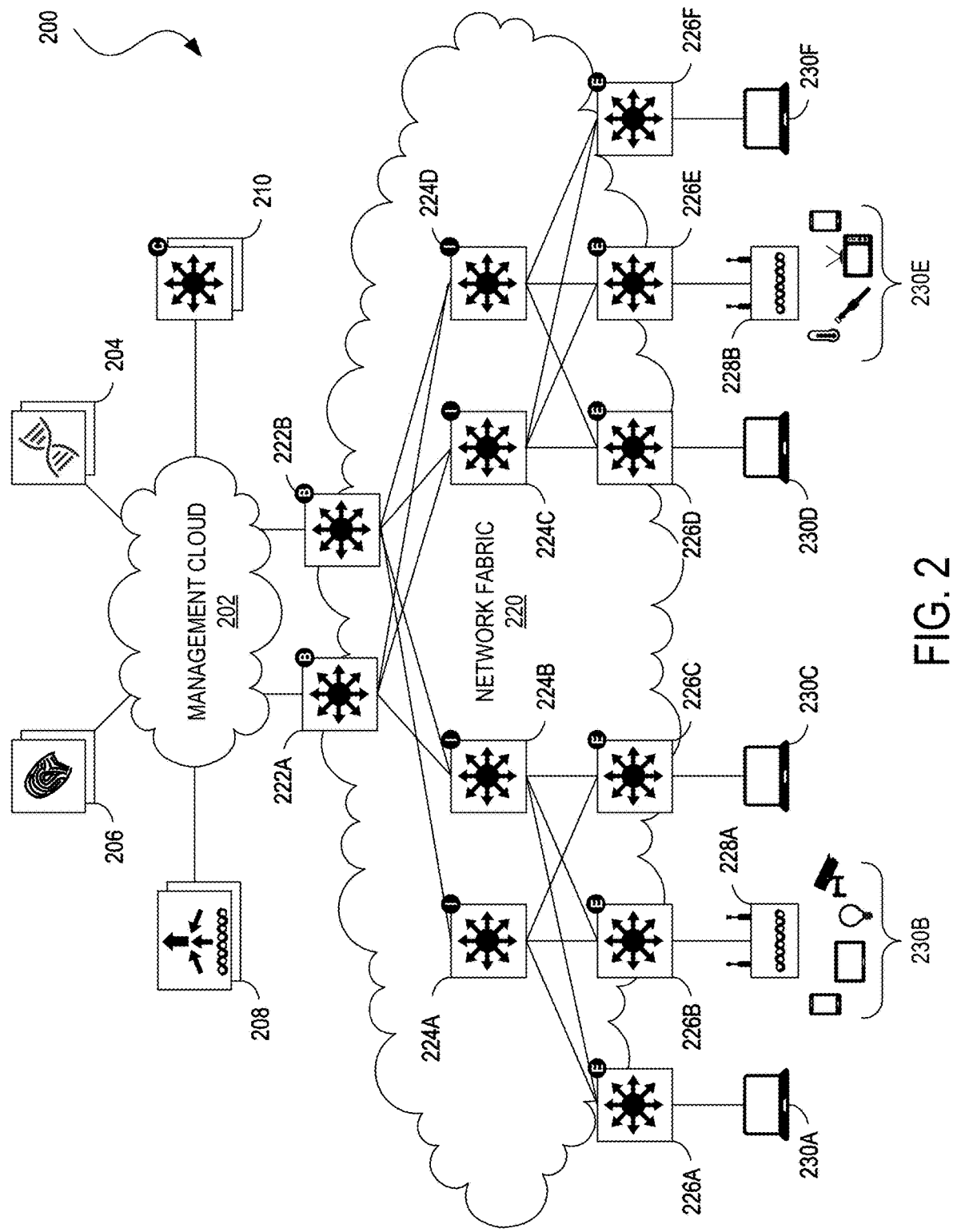
FIG. 2 illustrates an example of a physical topology of an enterprise network 200 for providing intent-based networking.

FIG. 2 illustrates an example of a physical topology of an enterprise network 200 for providing intent-based networking. It should be understood that, for the enterprise network 200 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 200 can include any number or type of resources, which can be accessed and utilized by endpoints or network devices. The illustrations and examples provided herein are for clarity and simplicity.

In this example, the enterprise network 200 includes a management cloud 202 and a network fabric 220. Although shown as an external network or cloud to the network fabric 220 in this example, the management cloud 202 may alternatively or additionally reside on the premises of an organization or in a colocation center (in addition to being hosted by a cloud provider or similar environment). The management cloud 202 can provide a central management plane for building and operating the network fabric 220. The management cloud 202 can be responsible for forwarding configuration and policy distribution, as well as device management and analytics. The management cloud 202 can comprise one or more network controller appliances 204, one or more authentication, authorization, and accounting (AAA) appliances 206, one or more wireless local area network controllers (WLCs) 208, and one or more fabric control plane nodes 210. In other embodiments, one or more elements of the management cloud 202 may be co-located with the network fabric 220.

The network controller appliance(s) 204 can function as the command and control system for one or more network fabrics, and can house automated workflows for deploying and managing the network fabric(s). The network controller appliance(s) 204 can include automation, design, policy, provisioning, and assurance capabilities, among others, as discussed further below with respect to FIG. 3. In some embodiments, one or more Cisco Digital Network Architecture (Cisco DNA™) appliances can operate as the network controller appliance(s) 204.

The AAA appliance(s) 206 can control access to computing resources, facilitate enforcement of network policies, audit usage, and provide information necessary to bill for services. The AAA appliance can interact with the network controller appliance(s) 204 and with databases and directories containing information for users, devices, things, policies, billing, and similar information to provide authentication, authorization, and accounting services. In some embodiments, the AAA appliance(s) 206 can utilize Remote Authentication Dial-In User Service (RADIUS) or Diameter to communicate with devices and applications. In some embodiments, one or more Cisco® Identity Services Engine (ISE) appliances can operate as the AAA appliance(s) 206.

The WLC(s) 208 can support fabric-enabled access points attached to the network fabric 220, handling traditional tasks associated with a WLC as well as interactions with the fabric control plane for wireless endpoint registration and roaming. In some embodiments, the network fabric 220 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 208.

The network fabric 220 can comprise fabric border nodes 222A and 222B (collectively, 222), fabric intermediate nodes 224A-D (collectively, 224), and fabric edge nodes 226A-F (collectively, 226). Although the fabric control plane node(s) 210 are shown to be external to the network fabric 220 in this example, in other embodiments, the fabric control plane node(s) 210 may be co-located with the network fabric 220. In embodiments where the fabric control plane node(s) 210 are co-located with the network fabric 220, the fabric control plane node(s) 210 may comprise a dedicated node or set of nodes or the functionality of the fabric control node(s) 210 may be implemented by the fabric border nodes 222.

The fabric control plane node(s) 210 can serve as a central database for tracking all users, devices, and things as they attach to the network fabric 220, and as they roam around. The fabric control plane node(s) 210 can allow network infrastructure (e.g., switches, routers, WLCs, etc.) to query the database to determine the locations of users, devices, and things attached to the fabric instead of using a flood and learn mechanism. In this manner, the fabric control plane node(s) 210 can operate as a single source of truth about where every endpoint attached to the network fabric 220 is located at any point in time. In addition to tracking specific endpoints (e.g., /32 address for IPv4, /128 address for IPv6, etc.), the fabric control plane node(s) 210 can also track larger summarized routers (e.g., IP/mask). This flexibility can help in summarization across fabric sites and improve overall scalability.

The fabric border nodes 222 can connect the network fabric 220 to traditional Layer 3 networks (e.g., non-fabric networks) or to different fabric sites. The fabric border nodes 222 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 222 can also exchange reachability and policy information with fabric control plane nodes of different fabric sites. The fabric border nodes 222 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 224 can operate as pure Layer 3 forwarders that connect the fabric border nodes 222 to the fabric edge nodes 226 and provide the Layer 3 underlay for fabric overlay traffic.

The fabric edge nodes 226 can connect endpoints to the network fabric 220 and can encapsulate/decapsulate and forward traffic from these endpoints to and from the network fabric. The fabric edge nodes 226 may operate at the perimeter of the network fabric 220 and can be the first points for attachment of users, devices, and things and the implementation of policy. In some embodiments, the network fabric 220 can also include fabric extended nodes (not shown) for attaching downstream non-fabric Layer 2 network devices to the network fabric 220 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 226 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 226 in that fabric site. For example, if the subnet 10.10.10.0/24 is provisioned in a given fabric site, this subnet may be defined across all of the fabric edge nodes 226 in that fabric site, and endpoints located in that subnet can be placed on any fabric edge node 226 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 222, 224, and 226.

The enterprise network 200 can also include wired endpoints 230A, 230C, 230D, and 230F and wireless endpoints 230B and 230E (collectively, 230). The wired endpoints 230A, 230C, 230D, and 230F can connect by wire to fabric edge nodes 226A, 226C, 226D, and 226F, respectively, and the wireless endpoints 230B and 230E can connect wirelessly to wireless access points 228B and 228E (collectively, 228), respectively, which in turn can connect by wire to fabric edge nodes 226B and 226E, respectively. In some embodiments, Cisco Aironet® access points, Cisco Meraki® MR access points, and/or other Cisco DNA™-ready access points can operate as the wireless access points 228.

The endpoints 230 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 230 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 220 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 208 notifying the fabric control plane node(s) 210 of joins, roams, and disconnects by the wireless endpoints 230 such that the fabric control plane node(s) can have connectivity information about both wired and wireless endpoints in the network fabric 220, and can serve as the single source of truth for endpoints connected to the network fabric. For data plane integration, the WLC(s) 208 can instruct the fabric wireless access points 228 to form a VXLAN overlay tunnel to their adjacent fabric edge nodes 226. The AP VXLAN tunnel can carry segmentation and policy information to and from the fabric edge nodes 226, allowing connectivity and functionality identical or similar to that of a wired endpoint. When the wireless endpoints 230 join the network fabric 220 via the fabric wireless access points 228, the WLC(s) 208 can onboard the endpoints into the network fabric 220 and inform the fabric control plane node(s) 210 of the endpoints' Media Access Control (MAC) addresses. The WLC(s) 208 can then instruct the fabric wireless access points 228 to form VXLAN overlay tunnels to the adjacent fabric edge nodes 226. Next, the wireless endpoints 230 can obtain IP addresses for themselves via Dynamic Host Configuration Protocol (DHCP). Once that completes, the fabric edge nodes 226 can register the IP addresses of the wireless endpoint 230 to the fabric control plane node(s) 210 to form a mapping between the endpoints' MAC and IP addresses, and traffic to and from the wireless endpoints 230 can begin to flow.

Figure 3:
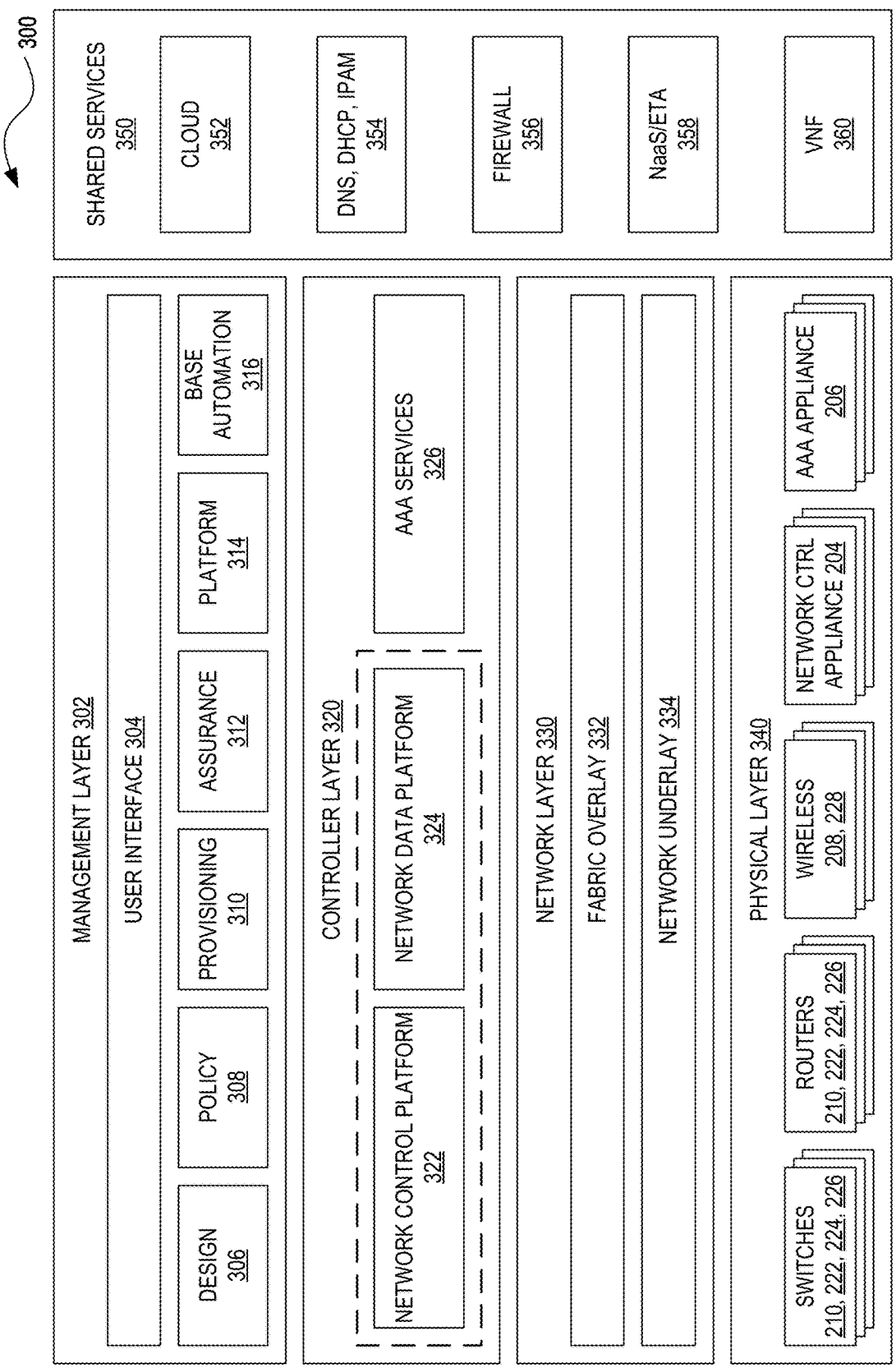
FIG. 3 illustrates an example of a logical architecture for an enterprise network.

FIG. 3 illustrates an example of a logical architecture 300 for an enterprise network (e.g., the enterprise network 200). One of ordinary skill in the art will understand that, for the logical architecture 300 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 300 includes a management layer 302, a controller layer 320, a network layer 330 (such as embodied by the network fabric 220), a physical layer 340 (such as embodied by the various elements of FIG. 2), and a shared services layer 350.

The management layer 302 can abstract the complexities and dependencies of other layers and provide a user with tools and workflows to manage an enterprise network (e.g., the enterprise network 200). The management layer 302 can include a user interface 304, design functions 306, policy functions 308, provisioning functions 310, assurance functions 312, platform functions 314, and base automation functions 316. The user interface 304 can provide a user a single point to manage and automate the network. The user interface 304 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 304 may also provide visibility information, such as views of a network, network infrastructure, computing devices, and things. For example, the user interface 304 can provide a view of the status or conditions of the network, the operations taking place, services, performance, a topology or layout, protocols implemented, running processes, errors, notifications, alerts, network structure, ongoing communications, data analysis, and so forth.

The design functions 306 can include tools and workflows for managing site profiles, maps and floor plans, network settings, and IP address management, among others. The policy functions 308 can include tools and workflows for defining and managing network policies. The provisioning functions 310 can include tools and workflows for deploying the network. The assurance functions 312 can use machine learning and analytics to provide end-to-end visibility of the network by learning from the network infrastructure, endpoints, and other contextual sources of information. The platform functions 314 can include tools and workflows for integrating the network management system with other technologies. The base automation functions 316 can include tools and workflows to support the policy functions 308, the provisioning functions 310, the assurance functions 312, and the platform functions 314.

In some embodiments, the design functions 306, the policy functions 308, the provisioning functions 310, the assurance functions 312, the platform functions 314, and the base automation functions 316 can be implemented as microservices in which respective software functions are implemented in multiple containers communicating with each rather than amalgamating all tools and workflows into a single software binary. Each of the design functions 306, policy functions 308, provisioning functions 310, assurance functions 312, and platform functions 314 can be viewed as a set of related automation microservices to cover the design, policy authoring, provisioning, assurance, and cross-platform integration phases of the network lifecycle. The base automation functions 314 can support the top-level functions by allowing users to perform certain network-wide tasks.

The controller layer 320 can comprise subsystems for the management layer 302 and may include a network control platform 322, a network data platform 324, and AAA services 326. These controller subsystems can form an abstraction layer to hide the complexities and dependencies of managing many network elements and protocols.

The network control platform 322 can provide automation and orchestration services for the network layer 330 and the physical layer 340, and can include the settings, protocols, and tables to automate management of the network and physical layers. For example, the network control platform 330 can provide the design functions 306 and the provisioning functions 310. In addition, the network control platform 330 can include tools and workflows for discovering switches, routers, wireless controllers, and other network infrastructure devices (e.g., a network discovery tool); maintaining network and endpoint details, configurations, and software versions (e.g., an inventory management tool); Plug-and-Play (PnP) for automating deployment of network infrastructure (e.g., a network PnP tool), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 322 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 322

The network data platform 324 can provide for network data collection, analytics, and assurance, and may include the settings, protocols, and tables to monitor and analyze network infrastructure and endpoints connected to the network. The network data platform 324 can collect multiple types of information from network infrastructure devices, including syslog, SNMP, NetFlow, Switched Port Analyzer (SPAN), and streaming telemetry, among others. The network data platform 324 can also collect use contextual information shared from In some embodiments, one or more Cisco DNA™ Center appliances can provide the functionalities of the management/provisioning layer 310, the network control platform 322, and the network data platform 324. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 326 can provide identity and policy services for the network layer 330 and physical layer 340, and may include the settings, protocols, and tables to support endpoint identification and policy enforcement services. The AAA services 326 can provide tools and workflows to manage virtual networks and security groups, and to create group-based policies and contracts. The AAA services 326 can identify and profile network infrastructure devices and endpoints using AAA/RADIUS, 802.1X, MAC Authentication Bypass (MAB), web authentication, and EasyConnect, among others. The AAA services 326 can also collect and use contextual information from the network control platform 322, the network data platform 324, and the shared services 350, among others. In some embodiments, Cisco® ISE can provide the AAA services 326.

The network layer 330 can be conceptualized as a composition of two layers, an underlay 334 comprising physical and virtual network infrastructure (e.g., routers, switches, WLCs, etc.) and a Layer 3 routing protocol for forwarding traffic, and an overlay 332 comprising a virtual topology for logically connecting wired and wireless users, devices, and things and applying services and policies to these entities. Network elements of the underlay 334 can establish connectivity between each other, such as via Internet Protocol (IP). The underlay may use any topology and routing protocol.

In some embodiments, the network controller 204 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 332 can be a logical, virtualized topology built on top of the physical underlay 334, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 220, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 220 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 220 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 220. It can be used as source and destination classifiers in Scalable Group ACLs (SGACLs). The SGT can be used to provide address-agnostic group-based policies.

In some embodiments, the fabric control plane node 210 may implement the Locator/Identifier Separation Protocol (LISP) to communicate with one another and with the management cloud 202. Thus, the control plane nodes may operate a host tracking database, a map server, and a map resolver. The host tracking database can track the endpoints 230 connected to the network fabric 220 and associate the endpoints to the fabric edge nodes 226, thereby decoupling an endpoint's identifier (e.g., IP or MAC address) from its location (e.g., closest router) in the network.

The physical layer 340 can comprise network infrastructure devices, such as switches and routers 210, 222, 224, and 226 and wireless elements 208 and 228 and network appliances, such as the network controller appliance(s) 204, and the AAA appliance(s) 206.

The shared services layer 350 can provide an interface to external network services, such as cloud services 352; Domain Name System (DNS), DHCP, IP Address Management (IPAM), and other network address management services 354; firewall services 356; Network as a Sensor (Naas)/Encrypted Threat Analytics (ETA) services; and Virtual Network Functions (VNFs) 360; among others. The management layer 302 and/or the controller layer 320 can share identity, policy, forwarding information, and so forth via the shared services layer 350 using APIs.

Figure 4:
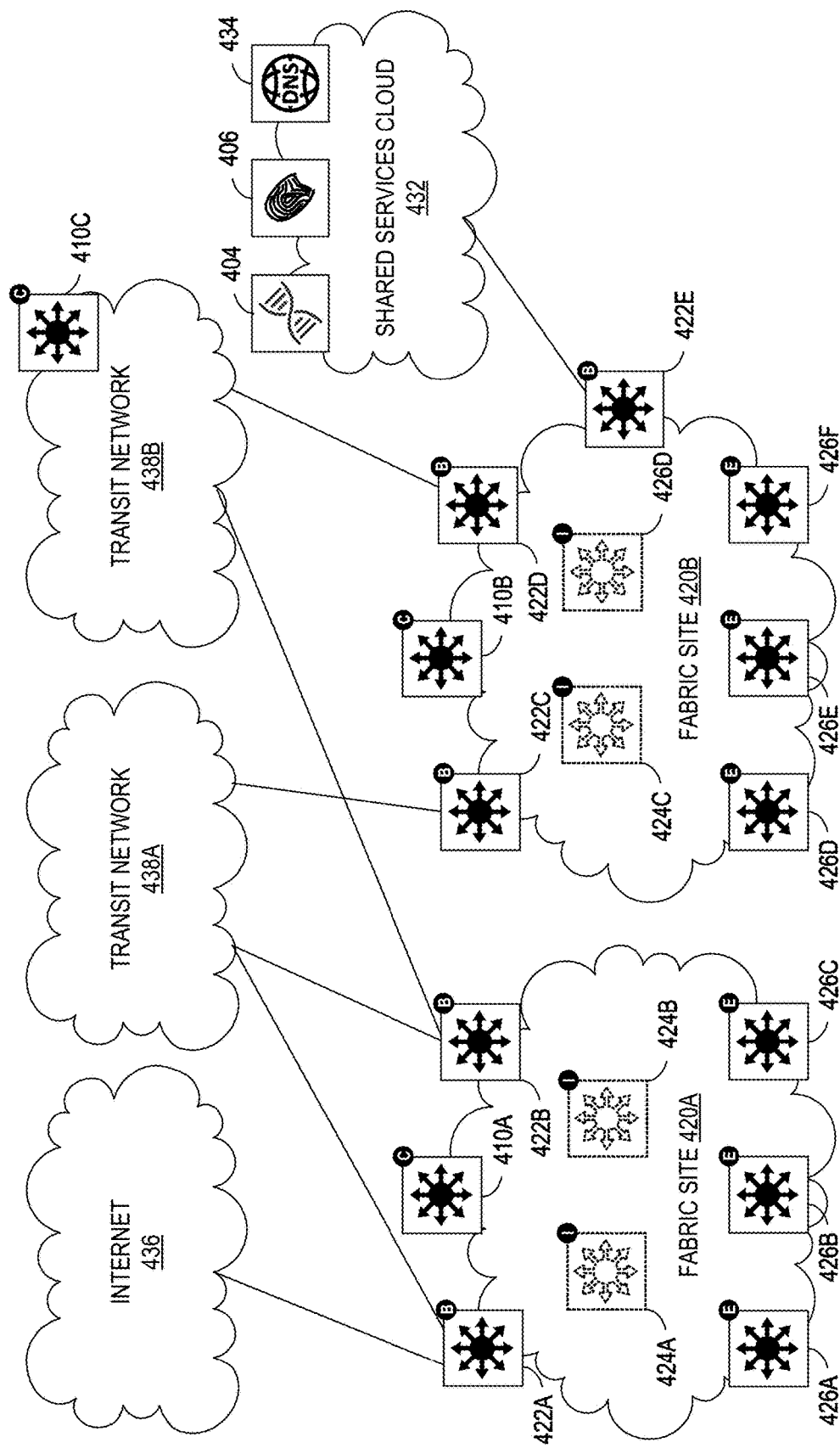
FIG. 4 illustrates an example of a physical topology for a multi-site enterprise network.

FIG. 4 illustrates an example of a physical topology for a multi-site enterprise network 400. In this example, the network fabric comprises fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can comprise one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

As discussed previously, STP loops are a serious network condition that can quickly lead to network outages and disrupt business operations. Specifically STP loops can lead to broadcast storms in the network. In turn, broadcast storms can saturate link bandwidth, and on some network devices cause high CPU utilization, thereby starving various control protocols. This can even cause Layer 3 interior gateway protocol (IGP) failure.

STP loops can arise in a network environment for a number of reasons. Specifically, unidirectional link failures, switch misconfigurations, incorrect wiring between nodes in the network environment, connecting an incorrectly implemented switch in a network environment that blocks bridge protocol data units (BPDUs), and server misconfigurations with virtual traffic switches can all lead to STP loops. While STP loops can be formed for a variety of different reasons, quickly identifying the occurrence of an STP loop and subsequently remedying the STP loop remains difficult. Specifically, STP loops are often identified after the loops have already caused network outages. Further, remedying the STP loop can often take hours after it is initially identified leading to continued network outages and poor network service.

The present includes systems, methods, and computer-readable media for solving these problems/discrepancies. Specifically, the present technology involves system, methods, and computer-readable media for identifying a potential spanning tree loop in a network environment based on correlated spanning tree loop indicators. Additionally, the present technology involves systems, methods, and computer-readable media for identifying a location of a potential spanning tree loop in a network environment using a network topology and remedying the spanning tree loop in the network environment, e.g. based on its location.

FIG. 5 shows an example environment 500 for detecting an STP loop, herein referred to as spanning tree loop, in a network environment. The example environment 500 includes a network environment 502. The network environment 502 can be an applicable network that utilizes STP, e.g. the enterprise network 200 shown in FIG. 2. The network environment 502 includes a first network node 504 and a second network node 506. The network nodes 504 and 506 can be applicable nodes in a network environment, e.g. switches and/or routers in the network environment 502.

In the example network environment 502, the first network node 504 and the second network node 506 form, at least part of, a potential spanning tree loop in the network environment 502. The potential spanning tree loop between the first network node 504 and the second network node 506 can be an actual spanning tree loop formed in the network environment 502. Alternatively, the potential spanning tree loop between the first network node 504 and the second network node 506 is not an actual spanning tree loop. Specifically, network traffic between the first network node 504 and the second network node 506 can be traffic that exhibits characteristics of a spanning tree loop, while an actual spanning tree loop is not formed between the first network node 504 and the second network node 506.

The STP loop detection system 508 functions to identify potential spanning tree loops in the network environment 502. Specifically, the STP loop detection system 508 can function to identify the existence of potential spanning tree loops in the network environment 502. For example, the STP loop detection system 508 can identify the existence of the potential spanning tree loop between the first network node 504 and the second network node 506.

The STP loop detection system 508 can be implemented as part of the network environment 502. Specifically, the STP loop detection system 508 can be implemented as part of a controller, e.g. the network controller appliance 204, for the network environment 502. For example, the STP loop detection system 508 can be implemented as part of a Cisco DNA controller for the network environment 502. All or portions of the STP loop detection system 508 can be implemented locally with respect to the network environment 502. Additionally, all or portion of the STP loop detection system 508 can be implemented remotely with respect to the network environment 502. For example, the STP loop detection system 508 can be implemented in a cloud computing environment that is remote from the network environment 502.

As part of identifying potential spanning tree loops in the network environment, the STP loop detection system 508 can identify spanning tree loop indicators occurring in the network environment 502. Spanning tree loop indicators include applicable events occurring in a network environment that are inherent to a spanning tree loop. Specifically, spanning tree loop indicators can include increases in port utilization at one or more nodes in a network environment, increases in volumes of broadcast traffic in all of or portions of the network environment, occurrences of MAC address flaps in the network environment, occurrences of router redundancy protocol flaps, e.g. Hot Standby Router Protocol ("HSRP") flaps or Virtual Router Redundancy Protocol ("VRRP") flaps, in the network environment, increases in computational resource utilization at one or more nodes in the network environment, increased volumes of packets transferred, e.g. punted, to one or more router processors in the network environment, STP state changes in the environment, e.g. increases in STP state changes at nodes in the network environment.

The STP loop detection system 508 can identify spanning tree loop indicators based on applicable characteristics of the network environment 502 operating to provide network service access. Characteristics of the network environment 502 operating to provide network service access can include characteristics of nodes in the network environment 502 operating to provide the network service access. For example, characteristics of the network environment 502 operating to provide network service access can include CPU utilization at nodes in the network environment 502. In another example, characteristics of the network environment 502 operating to provide network service access can include occurrences of flaps, e.g. MAC flaps and HSRP flaps, as nodes in the network environment 502. Further, characteristics of the network environment 502 operating to provide network service access can include characteristics of traffic flows in the network environment 502 operating to provide network service access. For example, characteristics of the network environment 502 operating to provide network service access can include broadcast storms occurring in the network environment 502. In another example, characteristics of the network environment 502 operating to provide network service access can include port utilization amounts of network traffic in the network environment 502.

The STP loop detection system 508 can identify characteristics of the network environment 502 from state telemetry data for the network environment 502, e.g. telemetry data of nodes operating in the network environment 502. In turn, the STP loop detection system 508 can identify spanning tree loop indicators from the state telemetry data for the network environment 502. State telemetry data for the network environment 502 can be collected at specific times, e.g. periodically, from the network environment 502. Further, state telemetry data can be pushed asynchronously from the network environment 502 at specific times, e.g. at specific times or in response to specific events.

State telemetry data can include applicable data describing characteristics of the network environment 502 operating to provide network service access. Further, state telemetry data of the network environment 502 can be generated and/or gathered by an applicable source and sent from the source to the STP loop detection system 508. For example, switches within the network environment 502 can perform device level analytics to generate telemetry data for the network environment 502. Specifically, the switches can generate telemetry data including one or a combination of indications of threshold crossings for overall port traffic utilization, indications of broadcast traffic utilization, indications of increases in CPU punt traffic, and indications of CPU utilization of specific processes detected through baselining and deviation from baseline.

The STP loop detection system 508 can identify characteristics of the network environment 502 by actively monitoring network events occurring in the network environment 502. In turn, the STP loop detection system 508 can identify spanning tree loop indicators in the network environment 502 by actively monitoring network events occurring in the network environment 502. Network events include applicable events associated with the network environment 502 that occur during operation of the network environment 502 to provide network service access. The STP loop detection system 508 can use telemetry data for the network environment 502 to monitor network events in the network environment 502. For example, the STP loop detection system 508 can monitor occurrences of flaps, e.g. MAC flaps and HSRP flaps, in the network environment 502 to identify spanning tree loop indicators. The flaps can be reported as system log events. The system log events, potentially including flap occurrences, can be included as part of telemetry data that is reported by switches in the network environment 502. MAC flaps, in particular, are good indicators of spanning tree loops as a MAC flap is caused when a specific source MAC address appears on more than one port, and hence a bridge is constantly shuffling the interface that the MAC address is learnt on in a VLAN.

Telemetry data can include STP states of ports within the network environment 502. Specifically, per-port-per-vlan STP states of ports related to inter-switch links can be included as part of telemetry data for identifying spanning tree loop indicators. The STP state is generally stable and does not change frequently. However, if the STP state changes due to a topology change, a Simple Network Management Protocol ("SNMP") trap can be generated to indicate which blocking port is going to a forwarding state. In turn, this information can be used to identify a potential spanning tree loop in the network environment 502.

The STP loop detection system 508 can correlate identified spanning tree loop indicators. Specifically and as will be discussed in greater detail later, the STP loop detection system 508 can correlate the identified spanning tree loop indicators to recognize a potential spanning tree loop in the network environment 502. In correlating spanning tree loop indicators, the STP loop detection system 508 can selectively group or associate spanning tree loop indicators with each other to form correlated spanning tree loop indicators.

The STP loop detection system 508 can temporally correlate spanning tree loop indicators. Specifically, the STP loop detection system 508 can temporally correlate spanning tree loop indicators according to times that the spanning tree loop indicators occur in the network environment 502. For example, the STP loop detection system 508 can correlate a MAC flap and an occurrence of increased CPU punt traffic if they both occur around the same time, e.g. within a specific period of time, in the network environment 502. Temporally correlating spanning tree loop indicators for identifying potential spanning tree loops is advantageous as many spanning tree loop indicators can occur in isolation during normal operation of a network environment. For example, a MAC address flap can occur when a VM changes location, high-port utilization can be caused by an elephant-flow, and high CPU utilization can occur for various other reasons during normal operation of a network environment. However, as more and more spanning tree loop indicators occur in temporal proximity to each other during operation of a network environment, the chance that a spanning tree loop has formed in the network environment increases. Therefore, temporally correlating spanning tree loop indicators can help to ensure that an actual spanning tree loop is identified.

Further, the STP loop detection system 508 can temporally correlate spanning tree loop indicators based on a sliding time window. Specifically, the STP loop detection system 508 can group spanning tree loop indicators that occur within a sliding time window together to form correlated spanning tree loop indicators. For example, the STP loop detection system can correlate spanning tree loop indicators that occur within a sliding time window of five minutes together. Further in the example, the spanning tree loop indicators can be evaluated at a set time interval within the sliding time window, e.g. every 10 seconds, as the window slides forward to correlate the spanning tree loop indicators.

The STP loop detection system 508 can recognize a potential spanning tree loop in the network environment 502 using the correlated spanning tree loop indicators. Specifically, the STP loop detection system 508 can analyze spanning tree loop indicators that are actually grouped together as part of the correlated spanning tree loop indicators to identify that a potential spanning tree loop, e.g. the potential spanning tree loop between the first network node 504 and the second network node 506, exists in the network environment 502.

The STP loop detection system 508 can recognize a potential spanning tree loop in the network environment 502 based on indicator types of the spanning tree loop indicators that are correlated together. Specifically, if multiple instances of the same type of spanning tree loop indicator occur in temporal proximity with each other, e.g. are correlated together, then the STP loop detection system 508 can recognize that a potential spanning tree loop exists in the network environment 502. For example, if a large number of MAC flaps occur in the network environment 502 within a five minute time frame, then the STP loop detection system 508 can determine that a potential spanning tree loop exists in the network environment 502. Further, if multiple instances of different types of spanning tree loop indicators occur in temporal proximity with each other, e.g. are correlated together, then the STP loop detection system 508 can recognize that a potential spanning tree loop exists in the network environment 502. More specifically, the STP loop detection system 508 can determine that a potential spanning tree loop exists in the network environment 502 if two or more different types of spanning tree loop indicators for the network environment 502 are correlated together. For example, if increases in CPU punt traffic and increases in CPU utilization occur within a five minute time frame, and are therefore correlated together, then the STP loop detection system 508 can determine that a potential spanning tree loop exists in the network environment 502.

Further, the STP loop detection system 508 can correlate spanning tree loop indicators and identify a potential spanning tree loop from correlated spanning tree loop indicators using rule-based machine reasoning. Machine reasoning, as used herein, includes applicable conclusion constructs that utilize logical techniques, such as deduction and induction, to correlate spanning tree loop indicators and identify potential spanning tree loops. Specifically, machine reasoning can include utilizing rules to implement logical techniques for correlating spanning tree loop indicators and identify potential spanning tree loops from correlated spanning tree loop indicators. Rules for implementing logical techniques as part of machine reasoning can be based on previous observations/data related to spanning tree loop indicator correlation and potential spanning tree loop identification. For example, if a combination of a ten percent increase in broadcast traffic and a presence of HSRP flaps was indicative of a spanning tree loop in a network environment, then the STP loop detection system 508 can deduce, through rule-based machine reasoning, that a potential spanning tree loop exists when both a ten percent increase in broadcast traffic and the presence of HSRP flaps exists in the network environment 502.

In response to determining the existence of a potential spanning tree loop in the network environment 502, the STP loop detection system 508 can remedy the potential spanning tree loop. As part of remedying the potential spanning tree loop, the STP loop detection system 508 can notify an entity associated with the network environment 502, e.g. a network administrator, about the potential spanning tree loop. In turn, the entity associated with the network environment 502 can take appropriate actions in order to prevent service interruptions or otherwise network failures caused by the potential spanning tree loop in the network environment 502.

Further, in remedying the potential spanning tree loop, the STP loop detection system 508 can identify a location of the potential spanning tree loop in the network environment 502. A location of a potential spanning tree loop can include physical and/or logical locations of nodes in the network environment 502 that are potentially associated with the spanning tree loop. Specifically, a location of a potential spanning tree loop in the network environment 502 can include identifications and locations of nodes in the network environment 502 that form the potential spanning tree loop. For example, the STP loop detection system 508 can identify the locations of the first network node 504 and the second network node 506 in the network environment 502 as part of remedying the potential spanning tree loop formed between the first and second network nodes 504 and 506. The STP loop detection system 508 can present a location of the potential spanning tree loop in the network environment 502 to an entity associated with the network environment 502. For example, the STP loop detection system 508 can present the location of the potential spanning tree loop to a network administrator who can then use the location to manually remedy the potential spanning tree loop.

The STP loop detection system 508 can identify a location of the potential spanning tree loop in the network environment 502 using a topology of the network environment 502. Specifically, the STP loop detection system 508 can determine the sets of ports/switches that are suspected to be a part of the potential spanning tree loop using a topology, e.g. physical and/or logical topology, of the network environment 502. The STP loop detection system 508 can then verify whether the suspected ports/switches are actually part of the potential spanning tree loop. Specifically, the STP loop detection system 508 can request STP states of the ports from the various network switches/nodes. Subsequently, the STP loop detection system 508 can verify that the suspected ports/switches are actually part of the potential spanning tree loop using the STP states of the ports. The STP loop detection system 508 can remedy the potential spanning tree loop based on the verified ports/switches associated with the potential spanning tree loop. Specifically, the STP loop detection system 508 can disable a port/switch that is verified as part of the potential spanning tree loop, e.g. as part of performing closed loop automation. More specifically, the STP loop detection system can disable specific interfaces at one or more specific ports/switches that are verified as part of the potential spanning tree loop. Further, the STP loop detection system 508 can present the verified ports/switches to an entity associated with the network environment 502.

The disclosure now turns to FIGS. 6 and 7, which illustrate example network devices and computing devices, such as switches, routers, load balancers, client devices, and so forth.

FIG. 6 illustrates a computing system architecture 600 wherein the components of the system are in electrical communication with each other using a connection 605, such as a bus. Exemplary system 600 includes a processing unit (CPU or processor) 610 and a system connection 605 that couples various system components including the system memory 615, such as read only memory (ROM) 620 and random access memory (RAM) 625, to the processor 610. The system 600 can include a cache 612 of high-speed memory connected directly with, in close proximity to, or integrated as part of the processor 610. The system 600 can copy data from the memory 615 and/or the storage device 630 to the cache 612 for quick access by the processor 610. In this way, the cache 612 can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

FIG. 7 illustrates an example network device 700 suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 704 to efficiently perform routing computations, network diagnostics, security functions, etc.

Although the system shown in FIG. 7 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    identifying spanning tree loop indicators occurring in a network environment that utilizes a spanning tree protocol;
    correlating the spanning tree loop indicators to identify correlated spanning tree loop indicators within the network environment;
    recognizing a potential spanning tree loop in the network environment from a plurality of the correlated spanning tree loop indicators based on indicator types of the correlated spanning tree loop indicators; and
    remedying the potential spanning tree loop in the network environment in response to recognizing the potential spanning tree loop in the network environment.

2. The method of claim 1, wherein the spanning tree loop indicators are correlated based on time to identify the correlated spanning tree loop indicators within the network environment.

3. The method of claim 1, wherein the potential spanning tree loop is determined based on whether the correlated spanning tree loop indicators include two or more different types of spanning tree loop indicators.

4. The method of claim 1, further comprising:
    identifying network nodes associated with the potential spanning tree loop using a topology of the network environment; and remedying the potential spanning tree loop based on the network nodes associated with the potential spanning tree loop.

5. The method of claim 4, further comprising:
receiving spanning tree protocol state information of the network nodes associated with the potential spanning tree loop;
verifying that the network nodes associated with the potential spanning tree loop are part of the spanning tree loop using the spanning tree protocol state information of the network nodes; and
remedying the potential spanning tree loop based on the network nodes associated with the potential spanning tree loop if it is verified that the network nodes are part of the spanning tree loop.

6. The method of claim 4, wherein remedying the potential spanning tree loop based on the network nodes associated with the potential spanning tree loop comprises disabling one or more specific interfaces of the one or more of the network nodes to break the potential spanning tree loop.

7. The method of claim 4, wherein remedying the potential spanning tree loop based on the network nodes associated with the potential spanning tree loop comprises presenting a location of the network nodes and the potential spanning tree loop within the network environment to a user.

8. The method of claim 1, wherein the spanning tree loop indicators are identified from state telemetry data of nodes operating in the network environment.

9. The method of claim 1, wherein the spanning tree loop indicators are identified by actively monitoring network events occurring during operation of the network environment.

10. The method of claim 1, wherein the spanning tree loop indicators include one or more increases in port utilization in the network environment.

11. The method of claim 1, wherein the spanning tree loop indicators include one or more increases in volumes of broadcast traffic in the network environment.

12. The method of claim 1, wherein the spanning tree loop indicators include one or more increases in used computational resources at nodes in the network environment.

13. The method of claim 1, wherein the spanning tree loop indicators include either or both one or more router redundancy protocol flaps and one or more media access control (MAC) address flaps occurring in the network environment.

14. The method of claim 1, wherein the spanning tree loop indicators are correlated and the potential spanning tree loop is recognized from the correlated spanning tree loop indicators using rule-based machine reasoning.

15. A system comprising:
one or more processors; and
at least one computer-readable storage medium having stored therein instructions which, when executed by the one or more processors, cause the one or more processors to perform operations comprising:
identifying spanning tree loop indicators occurring in a network environment that utilizes a spanning tree protocol;
correlating the spanning tree loop indicators to identify correlated spanning tree loop indicators within the network environment; and
recognizing a potential spanning tree loop in the network environment from a plurality of the correlated spanning tree loop indicators based on indicator types of the correlated spanning tree loop indicators.

16. The system of claim 15, wherein the instructions which, when executed by the one or more processors, further cause the one or more processors to perform operations comprising:
identifying network nodes associated with the potential spanning tree loop using a topology of the network environment; and
remedying the potential spanning tree loop based on the network nodes associated with the potential spanning tree loop.

17. The system of claim 16, wherein the instructions which, when executed by the one or more processors, further cause the one or more processors to perform operations comprising:
receiving spanning tree protocol state information of the network nodes associated with the potential spanning tree loop;
verifying that the network nodes associated with the potential spanning tree loop are part of the spanning tree loop using the spanning tree protocol state information of the network nodes; and
remedying the potential spanning tree loop based on the network nodes associated with the potential spanning tree loop if it is verified that the network nodes are part of the spanning tree loop.

18. The system of claim 15, wherein the potential spanning tree loop is determined based on whether the correlated spanning tree loop indicators include two or more different types of spanning tree loop indicators.

19. The system of claim 15, wherein the spanning tree loop indicators are correlated based on time to identify the correlated spanning tree loop indicators within the network environment.

20. A non-transitory computer-readable storage medium having stored therein instructions which, when executed by a processor, cause the processor to perform operations comprising:
identifying spanning tree loop indicators occurring in a network environment that utilizes a spanning tree protocol;
recognizing a potential spanning tree loop in the network environment based on the spanning tree loop indicators including two or more different types of spanning tree loop indicators; and
remedying the potential spanning tree loop in the network environment in response to recognizing the potential spanning tree loop in the network environment.

* * * * *